United States Patent [19]

Dominko

[11] 4,376,547
[45] Mar. 15, 1983

[54] LOUNGE CHAIR CONVERTIBLE WHEELS

[76] Inventor: Joseph S. Dominko, Poverty Hollow Rd., Newtown, Conn. 06470

[21] Appl. No.: 206,090

[22] Filed: Nov. 12, 1980

[51] Int. Cl.³ .................. A47C 13/00; B62B 1/00
[52] U.S. Cl. .................................. 280/30; 280/47.18; 280/654; 297/118; 297/130; 297/DIG. 4
[58] Field of Search ......... 297/118, 130, 131, DIG. 4; 16/30, 29; 280/30, 47.32, 47.18, 40, 654, 659

[56] References Cited

U.S. PATENT DOCUMENTS

| | | | |
|---|---|---|---|
| 1,017,799 | 2/1912 | Read | 16/30 |
| 1,394,493 | 10/1921 | Grazer | 297/118 X |
| 2,377,649 | 6/1945 | Quinney | 297/118 X |
| 2,523,893 | 9/1950 | Williamson | 280/40 |
| 3,023,020 | 2/1962 | Hasty | 280/654 |
| 3,337,228 | 8/1967 | Shulkin | 16/30 |
| 3,375,019 | 3/1968 | O'Day | 280/47.32 |
| 3,429,582 | 2/1969 | Embry | 280/47.18 X |
| 3,693,993 | 9/1972 | Mazzarelli et al. | 297/118 X |
| 4,114,914 | 9/1978 | Cohen | 280/30 |

FOREIGN PATENT DOCUMENTS

| | | | |
|---|---|---|---|
| 899201 | 7/1944 | France | 280/654 |
| 842929 | 7/1960 | United Kingdom | 16/30 |

Primary Examiner—James T. McCall
Attorney, Agent, or Firm—Murray J. Kessler

[57] ABSTRACT

A lounge chair assembly is made convertible by wheel assemblies which clamp to the lounge chair frame and stow out of the way by simple adjustment of the clamp portion of the wheel assembly.

2 Claims, 6 Drawing Figures

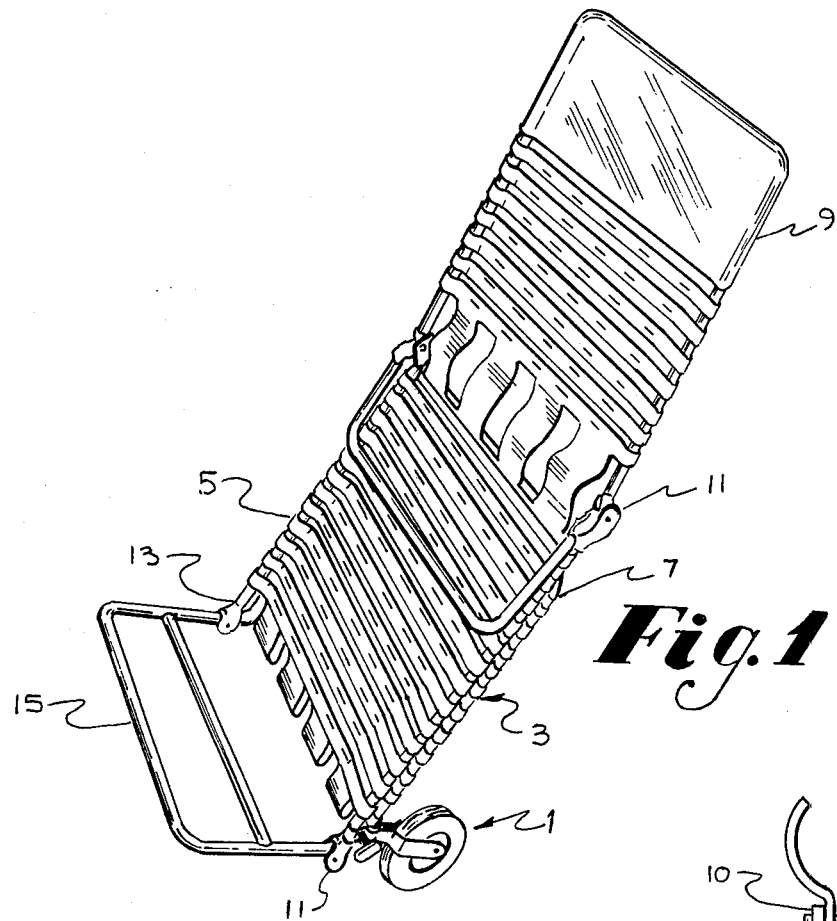
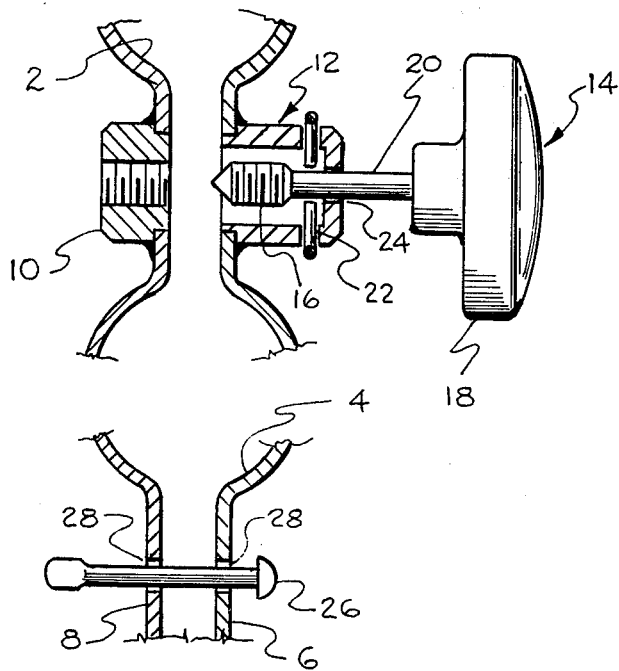
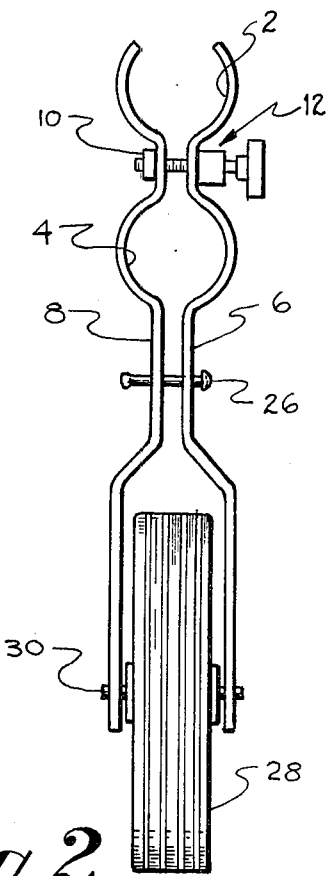
Fig. 1
Fig. 2
Fig. 3

LOUNGE CHAIR CONVERTIBLE WHEELS

SUMMARY OF INVENTION

A popular addition to recreational furniture in recent years is the folding rachet-type tubular lounge chair. These chairs, by virtue of the rachet mechanism at each pivot point, allow the chair to adjust from a vertical back chair to a flat platform bed and every position in between. While this type of lounge chair is versitile as a piece of furniture, it is limited to its function as a chair and due to the requirement of being sturdy, its chief drawback is that it is heavy and bulky making it difficult to carry from the house, car or parking lot to the lawn or beach. Couple the weight and bulk of the lounge chair with the usual paraphernalia carried to a picnic and the beach, it becomes obvious that this type of chair is not the best choice if a person has to carry other things.

The present invention turns the sturdy design and physical size of the lounge chair to an asset. The "Lounge Chair Convertible Wheels" clamp to two of the frame sections so that when the chair is inverted and the third section is extended, the chair becomes a hand cart that cannot only be easily wheeled around but can support and hold coolers, blankets, other chairs and the rest of the paraphernalia that the picnicker would want to carry. The lounge chair is now a wheeled cart easily moved from house or car to lawn or beach serving a dual purpose. The invention is so constructed that when the picnic area or beach is reached, a simple twist of the knob enables the wheels to be slipped around out of the way so that the lounge chair is reconverted to a functional lounge chair. The invention has a double clamp to capture two section frames, a captivated locking bolt to avoid loss of the bolt, a retainer to keep the sections oriented together, and a wheel and axle section.

DESCRIPTION OF DARWINGS

FIG. 1 shows the wheel clamp assembly pair attached to the lounge chair in perspective as a hand cart.

FIG. 2 shows the wheel clamp assembly in cross-section.

FIG. 3 shows in break-away the detail of the retainer and the retained bolt.

DETAILED DESCRIPTION

Figure 4:
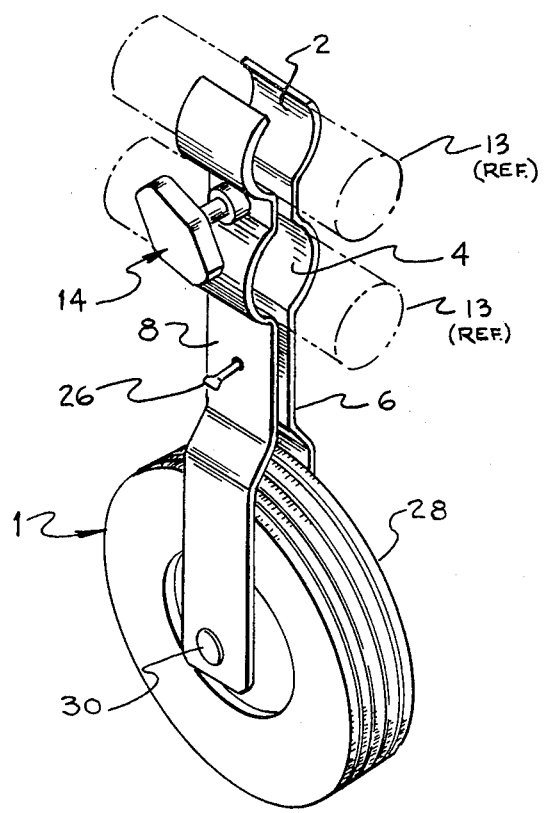
FIG. 4 shows in perspective the dual clamp section assembled to the two frame sections.

Referring to FIG. 1, the wheel clamp assemblies (1) attach to the lounge chair (3) in the following manner: The center section (5) and one of the end sections (7) are folded together with the center section (5) on top the other. End section (9) is extended to the full open position as allowed by the ratchet hinge (11). The section frame (13) of sections (5) and (7) are captivated by the upper clamp section (2) and lower clamp section (4) of the wheel clamp assembly (See FIG. 4). The folding leg assembly (15) of the lounge chair (3) is opened to act as a stop for cargo (not shown). Fully assembled, the lounge chair (3) is now a hand cart (3). The wheel assembly (1) attaches to the lounge chair (3) as follows,:

Referring to FIG. 2, the wheel clamp assembly (1) consists of two formed sections (6) and (8) to be assembled opposite one another and so formed and pierced that the opposite sections form an upper clamp section (2), a lower clamp section (4). Positioned over a hold on one formed section (8) between the clamp sections (2) and (4) is a clamping threaded recepticle (10) such as a weld nut or a pierced and formed internal threaded hold. Directly opposite over a hold in the other formed section (6) is a retainer assembly (12), see detail FIG. 3. Passing through the retainer assembly (12) is a clamp bolt assembly (14) which has an external threaded section (16) at one end connecting to a knob (18) by an undercut shaft (20). The diameter of the shaft is noticably smaller than the major diameter of the threaded section. The lengths of the sections (16), (18), and (20) of the bolt clamp assembly (14) are designed so that the knob (18) will butt against the outside of the retainer assembly (12) when the threaded section (16) engages the clamping threaded recepticle providing clamping force for the clamp sections (2) and (4) when they are around the section frames (13). The retainer assembly (12) has a wire formed clip (22) inserted in holes in the retainer assembly (12) positioned so that the clip (22) clears the undercut shaft (20) but would interfere with the threaded section (16). While the formed clip is the preferred embodiment to retain the clamp bolt assembly (13). Another method would be to thread the outer opening (24) of the retainer assembly (12). The retainer assembly (12) is dimensioned so that when the clamp bolt assembly (14) is withdrawn from the clamping threaded recepticle (10) it will recess far enough in the retainer assembly (12) to allow an open space between the clamp sections (2) and (4) large enough to clear the rachet hinge (11).

Positioned below the lower clamp section (4) is a retainer (26) such as an elongated rivet inserted through corresponding holes (28) in the two sections. The retainer (26) keeps the section (2) and (4) from separating when the wheel clamp assembly (1) is moved from one position to another.

The lower section of the wheel clamp assembly (1) is a wheel (28) and axel (30) combination of usual design.

Figure 5:
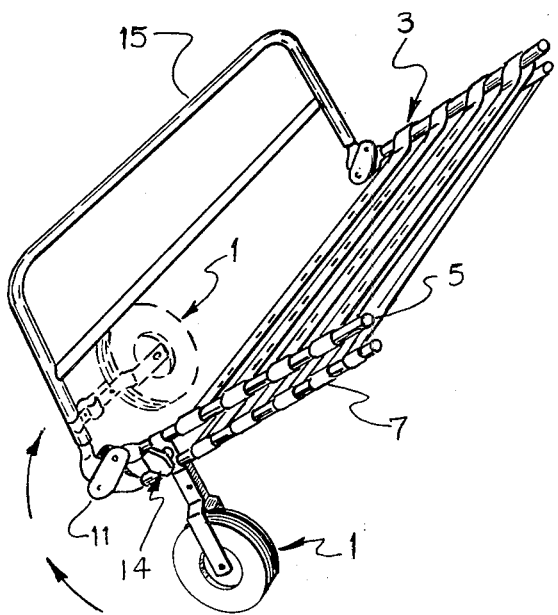
FIG. 5 shows in perspective the sequence of steps converting the hand cart set up to stow the wheels out of the way.
Figure 6:
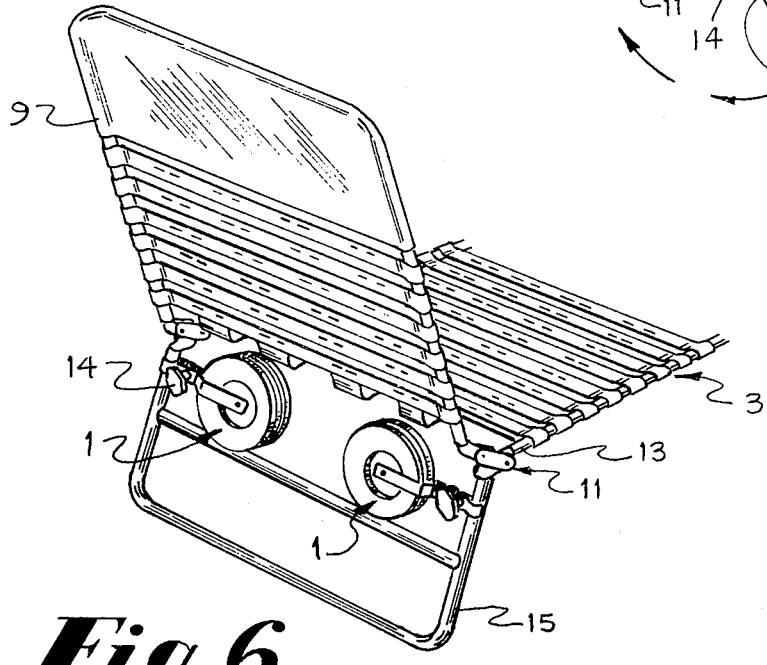
FIG. 6 shows in perspective an end view of the lounge chair set up as a chair with the wheels stowed under the chair.

Converting from hand cart to chair (refer to FIGS. 5 and 6) requires loosening the clamp bolt assembly (14), pulling it into the retainer assembly (12) sliding the wheel clamp assembly (1) along the section frames (13), over the rachet hinge (11), sliding the upper clamp section (2) onto the folding leg assembly (15), positioning the wheel clamp assembly (1) in the plane of the folding leg assembly (15) and tightening the clamp bolt assembly (14) holding the wheel clamp assembly (1) out of the way. The lounge chair (3) may now be set up as a chair. The retainer (26) is dimensioned to allow the sections (2 and 4) to open wide enough to remove the entire wheel clamp assembly (1) from the frame.

I claim:

1. Lounge chair convertible wheels comprising a three-section folding tubular framed chair assembly with hinging means at each section junction with the other sections, each of said hinging means having a position locking means, with folding leg assemblies attached to the center section of said three section chair and at least two moveable and removeable wheel and clamp assemblies for clamping said wheel and clamp assemblies to the tubular frames and folding legs of said chair assembly; said moveable and removeable wheel and clamp assembly comprising sections so formed as to have two clamp sections, each said clamp section shaped to fit over the frame of two of the sections of said chair assembly, and over the shape of the folding legs, at least one wheel axle assembly, retaining means between the clamp section and the wheel axle assembly to keep said side sections from separating or rotating about the axle, and clamping means to draw each said side member together as a clamp.

2. The lounge chair convertible wheels as defined by claim 1 wherein one said formed section has means to retain said clamping means to said section and to allow said clamping means to separate completely from the other section.

* * * * *